(12) United States Patent
Xu et al.

(10) Patent No.: US 11,776,430 B1
(45) Date of Patent: Oct. 3, 2023

(54) ASSEMBLED STRUCTURE CONTAINER AND PLATEFORM OF SEISMIC FAULT SIMULATION TEST

(71) Applicant: JIANGHAN UNIVERSITY, Wuhan (CN)

(72) Inventors: Longjun Xu, Wuhan (CN); Xujian Yang, Wuhan (CN); Heng Zhang, Wuhan (CN); Qihan Xu, Wuhan (CN); Lili Xie, Wuhan (CN)

(73) Assignee: JIANGHAN UNIVERSITY, Wuhan (CN)

( * ) Notice: Subject to any disclaimer, the term of this patent is extended or adjusted under 35 U.S.C. 154(b) by 0 days.

(21) Appl. No.: 18/326,994

(22) Filed: May 31, 2023

(30) Foreign Application Priority Data

Apr. 6, 2022 (CN) .......................... 202210355121.2

(51) Int. Cl.
*G06F 17/10* (2006.01)
*G09B 23/40* (2006.01)

(52) U.S. Cl.
CPC .................................. *G09B 23/40* (2013.01)

(58) Field of Classification Search
CPC .................................................... G05B 23/40
USPC ............................................ 703/1; 434/299
See application file for complete search history.

(56) References Cited

U.S. PATENT DOCUMENTS

| 6,734,769 B1* | 5/2004 | Germain | H01H 83/04 361/42 |
| 2001/0052766 A1* | 12/2001 | Drescher | G01R 31/318502 703/16 |
| 2011/0078526 A1* | 3/2011 | Mohr | G01R 31/007 714/E11.054 |
| 2019/0138671 A1* | 5/2019 | Funabashi | G06F 30/20 |

FOREIGN PATENT DOCUMENTS

| CN | 101916523 A | 12/2010 |
| CN | 104809947 A | 7/2015 |
| CN | 107144461 A | 9/2017 |
| CN | 109754697 A | 5/2019 |

(Continued)

OTHER PUBLICATIONS

Edris et al. (Updating Fault Transmissivities in Simulations by Successively Adding Data to an Automated Seismic History Matching Processes: A Case Study, 9 pages). (Year: 2008).*

(Continued)

*Primary Examiner* — Andre Pierre Louis
(74) *Attorney, Agent, or Firm* — Nitin Kaushik (57) ABSTRACT

The present invention relates to the technical field of researching and developing a seismic fault motion simulation experimental instrument, and particularly relates to a matching box body structure for simulating fault motion and a seismic fault simulation experimental platform, including a left box body and a right box body arranged in a left and right matching manner, wherein the inner cavities of the left box body and the right box body communicate with each other and form an accommodating cavity for accommodat- (Continued)

ing a soil layer, both the left box body and the right box body include a main box body, two sides along the left direction and right direction have openings, and the top side has an opening; and an end cover.

8 Claims, 11 Drawing Sheets

(56) References Cited

FOREIGN PATENT DOCUMENTS

| | | |
|---|---|---|
| CN | 110780056 A | 2/2020 |
| CN | 112435527 A | 3/2021 |
| CN | 112557171 A | 3/2021 |
| CN | 112683561 A | 4/2021 |
| CN | 114152510 A | 3/2022 |
| JP | 2009236802 A | 10/2009 |

OTHER PUBLICATIONS

Zycad Corporation (Fault Simulation Basics, 9 pages) (Year: 1989).*

* cited by examiner

ASSEMBLED STRUCTURE CONTAINER AND PLATEFORM OF SEISMIC FAULT SIMULATION TEST

CROSS-REFERENCE TO RELATED APPLICATIONS

The application claims priority to Chinese patent application No. 2022103551212, filed on Apr. 6, 2022, the entire contents of which are incorporated herein by reference.

TECHNICAL FIELD

The present invention relates to the technical field of researching and developing a simulation experimental instrument for seismic fault motion, and particularly to a assembled container body structure for simulating fault motion and a simulation test platform for seismic fault.

BACKGROUND

With the development of human society and the economy, the construction of large-scale civil engineering, transportation, water conservancy, ocean, and other infrastructure projects is becoming more and more popular, and continuously extending and shifting towards the distribution zone of seismic faults. More and more long, large, and linear civil engineering infrastructures crossing/spanning faults are facing the threat of seismic fault activities. When large-scale engineering facilities such as tunnels, bridges, railways, pipelines, and buildings span/cross an active fault zone, the fault movement will exert tension, compression, or shearing action on the engineering structures, resulting in large deformation of structures and facilities until a failure. Once it occurs, the social and economic losses will be difficult to evaluate.

At present, little is known to us about the motion characteristics and action rules of seismic faults, and their impacts on engineering, and research on them is insufficient, to the extent that even scientific experimental methods— fault simulation experimental devices—do not have feasible and authentic recognized solutions. The lack of scientific experimental equipment is a key bottleneck problem that restricts relevant experimental research and theoretical breakthroughs.

In the prior art, the simulation of a side of fault mostly uses a steel structure box body filled with an earth rock material. According to the functional requirements of a test, the fault box body generally has the characteristics of large-scale, large load, high strength, and high stiffness, and is complicated to be processed and expensive to be manufactured and inconvenient to be replaced. For example, according to the Chinese invention patent "seismic fault simulation experimental platform" with the patent application number CN202011402931.6 (publication number CN14383561A), the left box body and the right box body are communicated to form a containing cavity for containing a soil layer, and the pressing plates are arranged on the surface of the soil layer in a matrix shape; when testing, the cross-fault (tunnel) structural model to be tested is buried in the soil layer, the three-axis driving assembly drives the left box body and the right box body to generate relative movement, and by pushing down the pressing plate through the first driving device, different pressures are applied to the soil layers at different positions and each first driving device can also independently control the pressure of each corresponding pressing plate, accurately simulating the non-uniform stress state on the top of civil engineering structures and infrastructure caused by different terrains and stress environments, and studying the impact of shear action of fault displacement on the model to be tested.

However, due to the fixed size of the above-mentioned box body structure, when cross-fault simulation experiments with different-scale model structures are carried out, it is still impossible to achieve acts according to actual circumstances, resulting in time-consuming, labor-intensive, and unnecessary waste issues.

SUMMARY

The first technical problem to be solved by the present invention is to provide, in view of the current state of the prior art, a matching box body structure with assembly flexibility and capable of meeting the research requirements of models to be tested of different sizes, for simulating fault motion.

The second technical problem to be solved by the present invention is to provide a seismic fault simulation experimental platform using the above-mentioned matching box body structure.

The technical solution adopted by the present invention to solve the above-mentioned first technical problem is: a matching box body structure for simulating fault motion, comprising: a left box body and a right box body arranged in a left-right matching manner, wherein inner cavities of the left box body and the right box body are in communication and form an accommodating cavity for accommodating a soil layer; both the left box body and the right box body comprise:

a main box body, the main box body having an opening on two sides in left direction and right direction and the top side having an opening, wherein the main box body comprises: a bottom plate, and two side surface assembly structures mounted on a front side and rear side of the bottom plate, wherein the assembly structure comprises at least two vertical support frames, the vertical support frames are arranged at intervals in the left direction and right direction, the vertical support frames are arranged vertically, a bottom end of the vertical support frame is connected to the bottom plate, a blocking member is provided between two adjacent vertical support frames, the blocking member comprises at least two transverse slats arranged successively in a vertical direction, in each set of blocking members, end faces of two ends of each transverse slat respectively abut on opposite faces of the vertical support frame corresponding to two sides of the blocking member, and adjacent side edges of two adjacent transverse slats abut against each other;

and an end cover, wherein the end cover is provided at the opening of one side of the main box body.

As a preferred implementation solution of the present invention, each of the side face assembly structures further comprises a first locking device provided between the end of the transverse slat and the vertical support frame adjacent to the end of the transverse slat for fixing the transverse slat relative to the corresponding vertical support frame.

As a preferred implementation solution of the present invention, a substantially vertically arranged limiting bar is locally and convexly provided on opposite faces of the vertical support frame corresponding to two sides of the blocking member, the limiting bar being located on the outer side of the transverse bar;

the first locking device comprises:

a first base provided on the transverse slats;

a first rotating shaft, the first rotating shaft being rotatably connected to the first base, and the first rotating shaft penetrating through the first base;

a cam provided at one end of the first rotating shaft, a peripheral wall abutting against an outer side wall of the limiting bar; and a first handle provided at the other end of the first rotating shaft for driving the first rotating shaft to rotate relative to the first base so that the transverse slat abuts an inner side wall of the limiting bar.

As a preferred implementation solution of the present invention, a first protruding edge is provided at a side edge of the transverse slat, the first protruding edges at adjacent side edges of two adjacent transverse slats abutting against each other.

As a preferred implementation solution of the present invention, two adjacent vertical support frames and blocking members located therebetween are denoted as side plate units, a corresponding set of side plate units respectively located on two side surface assembly structures is set as one side plate module, a pressurizing device is mounted on a top of the main box body, the pressurizing device comprises pressing plate units corresponding to the side plate modules on a one-to-one basis, and the pressing plate unit comprises:

a support bar, wherein two support bars are provided, the two support bars correspond to the side plate unit corresponding to the side plate module on a one-to-one basis, and two ends of each support bar are respectively connected to the top ends of two vertical support frames of the corresponding side plate unit;

a mounting bar, wherein at least two mounting bars are provided, the mounting bars are successively arranged in a left direction and right direction, and two ends of each mounting bar are respectively limited on two of the support bars;

a pressing bar, wherein at least two pressing bars are provided, the pressing bar corresponds to the mounting bar on a one-to-one basis, the pressing bar is located directly below the corresponding mounting bar, and adjacent side edges of two adjacent pressing bars are close to each other; and a driving device mounted on the mounting bar, wherein the driving device has a power output end moving in a vertical direction, and the power output end is connected to a corresponding pressing bar; adjacent side edges of adjacent pressing bars of two adjacent pressing plate units are close to each other such that the pressing bars of all pressing plate units are integrally formed with one pressing plate covering a surface of the soil layer.

As a preferred implementation solution of the present invention, the pressing plate unit further includes:

a second locking device provided between the end of the mounting bar and a support bar adjacent to the end of the mounting bar, for fixing the mounting bar relative to the corresponding support bar.

As a preferred implementation solution of the present invention, the second locking device includes:

a second base, wherein the second base is provided on the mounting bar, one end of the second base is provided with a limiting groove, and the other end of the second base is provided with an accommodating groove;

a second rotating shaft, wherein the second rotating shaft is rotatably connected to the second base, the second rotating shaft penetrates through the second base, the second rotating shaft can slide in an axial direction, a limiting protrusion corresponding to the limiting groove is convexly provided on a peripheral wall of a first end of the second rotating shaft, and a stopping block corresponding to the accommodating groove is provided on a second end of the second rotating shaft;

an elastic member provided between the second base and the stopping block, in the same way that the stopping block always has a tendency to overhang the accommodating groove; and a second handle provided at the first end of the second rotating shaft for driving the second rotating shaft to rotate in a circumferential direction or to slide in the circumferential direction; wherein in the locked state, the limiting protrusion is accommodated in the limiting groove and abuts against a bottom wall of the limiting groove, the stopping block extends out of the accommodating groove, and the support bar is limited between the stopping block and the mounting bar;

in an unlocked state, the limiting projection abuts against an end face of the first end of the second base, and the stopping block is provided in the accommodating groove for releasing a limiting action on the support bar.

As a preferred implementation solution of the present invention, the elastic member is a compression spring sleeved on the periphery of the second rotating shaft and arranged in the accommodating groove, and two ends of the compression spring respectively abut on a bottom surface of the accommodating groove and the stopping block.

As a preferred implementation solution of the present invention, an adjustable box body is mounted on the other side of the main box body, a side edge of the adjustable box body facing one side of the main box body is detachably connected to the side edge of the other side of the main box body, and the side edge of the adjustable box body facing away from one side of the main box body is provided with a second protruding edge; a second protruding edge of the adjustable box body on the left box body can move relative to the second protruding edge of the adjustable box body on the right box body and is always closely adhered to the second protruding edge of the adjustable box body on the right box body, and the included angle between a contact surface between the second protruding edge of the adjustable box body on the left box body and the second protruding edge of the adjustable box body on the right box body and a horizontal plane is denoted as $\alpha$, wherein $45°\leq\alpha\leq90°$.

A simulation experimental platform for the seismic fault of a matching box body structure for simulating fault motion includes:

a first driving mechanism, wherein the first driving mechanism is drivingly connected to the bottom plate of the left box body for driving the left box body to move forward and backward;

a second driving mechanism drivingly connected to the bottom plate of the left box body for driving the left box body to move left and right;

and a third driving mechanism drivingly connected to the bottom plate of the right box body for driving the right box body to move up and down.

The advantages of the present invention over the prior art are as follows.

(1) At least two transverse slats arranged in sequence in the vertical direction constitute a blocking member, and the blocking member is assembled between two adjacent vertical support frames arranged at intervals in the left direction and right direction such that an appropriate number of transverse slats and an appropriate number of vertical support frames are selected and a main box body with an appropriate length and height can be constituted, thereby meeting the research requirements of models to be tested with different sizes. It can be flexibly constructed and disassembled without the need to replace the entire box body structure.

(2) By constituting a pressurizing device with at least two sets of pressing plate units corresponding to the side plate modules on a one-to-one basis, on the one hand, it can be matched with different numbers of side plate modules, and on the other hand, each driving device can independently control the pressure of each corresponding pressing bar, thereby accurately simulating the non-uniform stress state on the top of civil engineering structures and infrastructures caused by different terrains and different stress environments, and studying the shear effect of fault displacement on the model to be tested.

(3) Since the main box body and the adjustable box body are detachably connected, it is only necessary to replace the adjustable box body without replacing the entire box body structure if the model to be tested is to be simulated under the influence of faults with different directions and different geometric parameters.

BRIEF DESCRIPTION OF DRAWINGS

In order to illustrate the embodiments of the present invention or the technical solutions in the prior art more clearly, the following will briefly introduce the drawings that need to be used in the description of the embodiments or the prior art. Obviously, the drawings in the following description are merely some embodiments of the present invention. For those of ordinary skills in the art, other drawings can be obtained according to the structure shown in these drawings without involving inventive efforts.

The implementation, functional features, and advantages of the present invention will be further explained in conjunction with the embodiments, with reference to the accompanying drawings.

DETAILED DESCRIPTION OF THE EMBODIMENTS

The technical solutions in the embodiments of the present invention will be clearly and completely described below in conjunction with the accompanying drawings in the embodiments of the present invention. Obviously, the described embodiments are only a part of the embodiments of the present invention, rather than all the embodiments. Based on the embodiments of the present invention, all other embodiments obtained by one of ordinary skills in the art without involving any inventive effort are within the scope of the present invention.

It needs to be noted that all directivity indications (such as up, down, left, right, front, rear, etc.) in the embodiments of the present invention are only used to explain the relative positional relationship, motion, etc. between components at a particular attitude (as shown in the drawings). If the particular attitude is changed, the directivity indication is changed accordingly.

In addition, in the present invention, descriptions related to "first", "second", etc. are only used for descriptive purposes, and are not to be construed as indicating or implying relative importance or implicitly indicating the number of technical features indicated. Therefore, a feature defined as "first" or "second" may explicitly or implicitly include at least one such feature. In addition, the technical solutions between the various embodiments can be combined with each other, but must be based on what ordinary technical personnel in the art can achieve. When the combination of technical solutions conflicts or cannot be achieved, it should be considered that the combination of such technical solutions does not exist and is not within the scope of protection claimed by the present invention.

Embodiment 1

Figure 1:
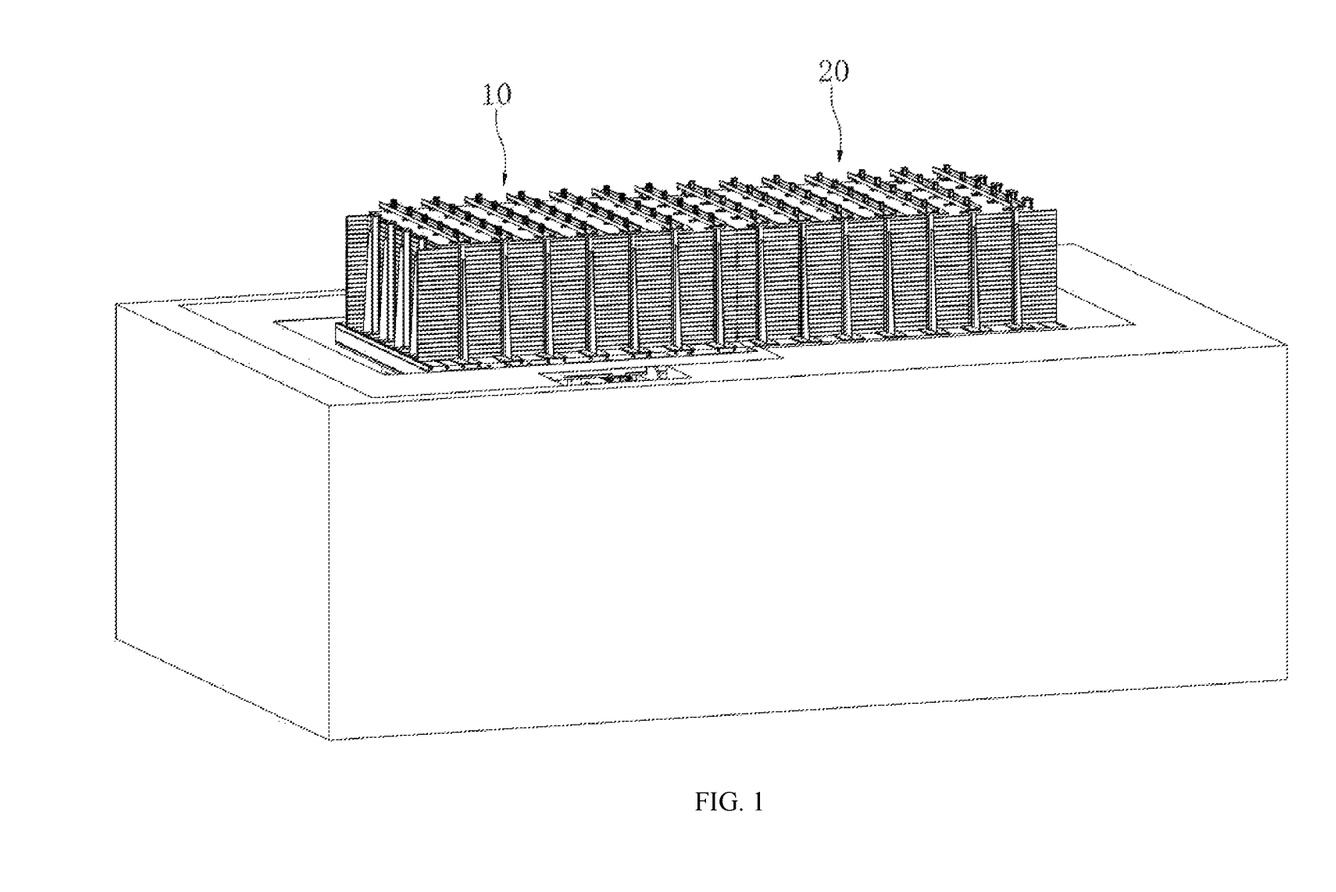
FIG. 1 is a schematic view of a three-dimensional structure mounted in a foundation pit of embodiment 1 of a seismic fault simulation experimental platform of the present invention.
Figure 2:
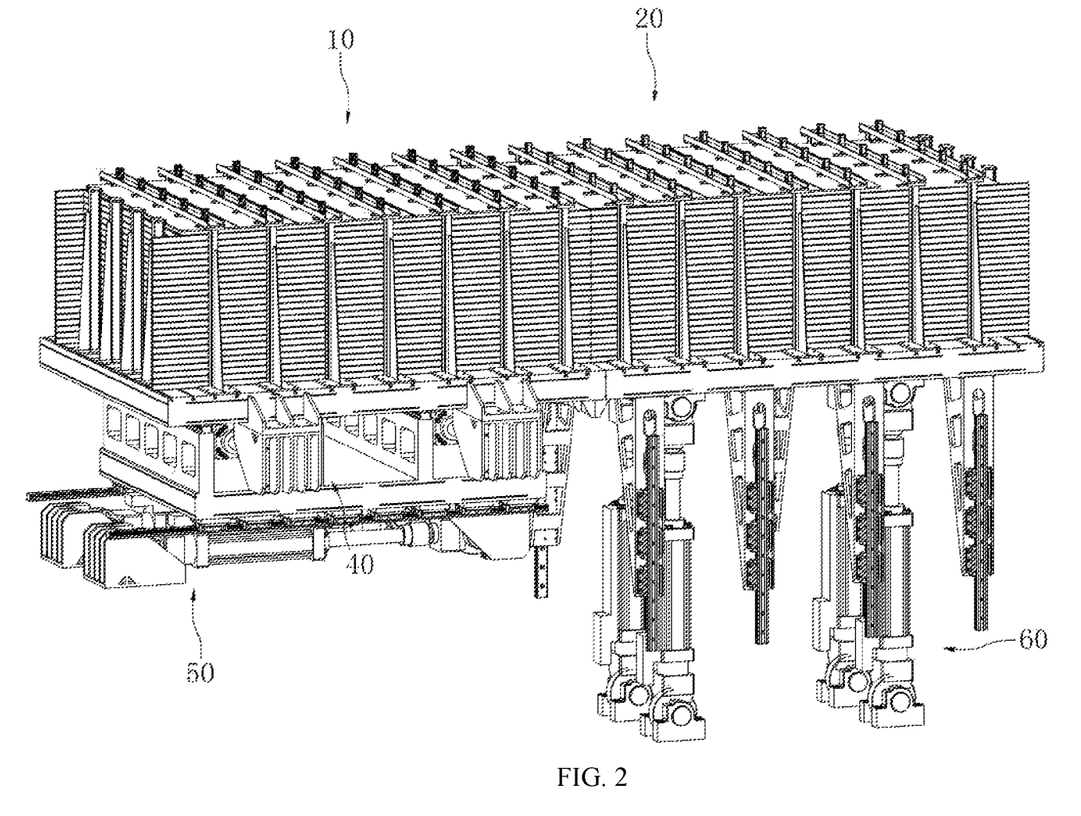
FIG. 2 is a schematic diagram of a three-dimensional structure of the seismic fault simulation experimental platform in FIG. 1.
Figure 3:
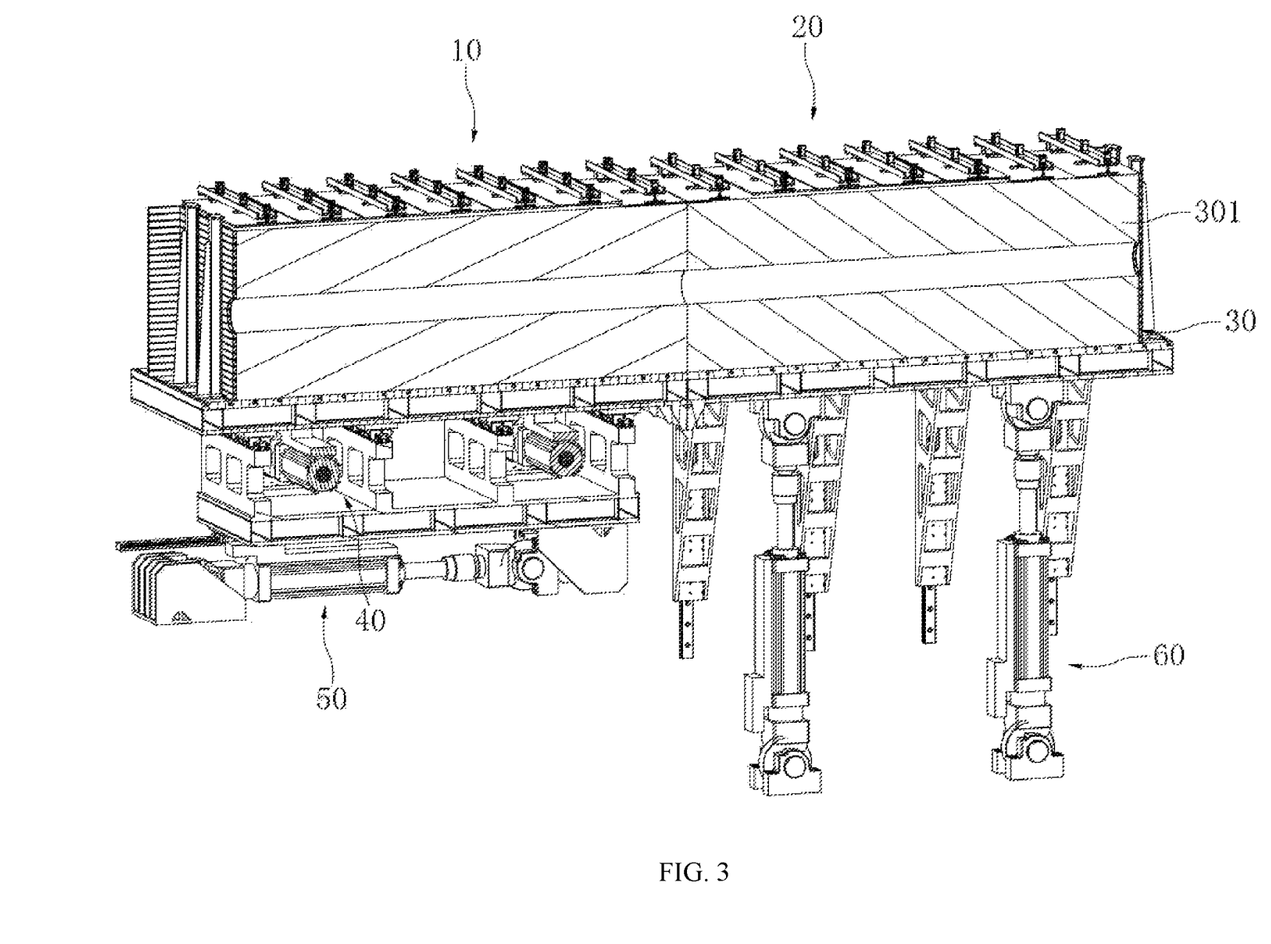
FIG. 3 shows a longitudinal sectional view of the seismic fault simulation experimental platform in FIG. 2.

Referring to FIGS. 1 to 3, there is shown the first preferred embodiment of a seismic fault simulation experimental platform of the present invention. The seismic fault simulation experimental platform comprises a left box body 10, a right box body 20, a first driving mechanism 40, a second driving mechanism 50, and a third driving mechanism 60.

The right side of the left box body 10 has an opening, and the left side of the right box body 20 has an opening; after the left and the right are arranged in a matching manner, the left box body 10 and the right box body 20 constitute a matching box body structure, and the inner cavities of the two communicate with each other and form an accommodating cavity 30 for accommodating the soil layer 301.

Specifically, as shown in FIG. 2, both the left box body 10 and the right box body 20 include a main box body 1, an end cover 2, and a pressurizing device 4. Two sides of the main box body 1 along the left direction and the right direction have an opening, and the top side also has an opening; the main box body 1 comprises a bottom plate 11 and two side face assembly structures mounted on the front side and rear side of the bottom plate 11, wherein each side face assembly structure comprises at least two sets of side plate units arranged in sequence along the left direction and the right direction, and one corresponding set of side plate units respectively located on two side face assembly structures is set as one side plate module; the end cover 2 covers an opening at one side of the main box body 1, and a through hole 21 is provided at a middle position of the end cover 2; the pressurizing device 4 is mounted on the top of the main box body 1, and comprises pressing plate units corresponding to the side plate modules on a one-to-one basis; the side edge on the other side of the main box body 1 on the left box body 10 abuts against the side edge on the other side of the main box body 1 on the right box body 20.

The first driving mechanism 40 is drivingly connected to the bottom plate 11 of the left box body 10 for driving the left box body 10 to move forward and backward.

The second driving mechanism 50 is drivingly connected to the bottom plate 11 of the left box body 10 for driving the left box body 10 to move left and right.

The third driving mechanism 60 is drivingly connected to the bottom plate 11 of the right box body 20 for driving the right box body 20 to move up and down.

The bottom plate 11 of the left box body 10, the first driving mechanism 40, and the second driving mechanism 50 constitute a left experimental platform, and the left experimental platform respectively performs axial and vertical axial movements in a horizontal plane along two axial directions of the platform; the bottom plate 11 of the above-mentioned right box body 20 and the third driving mechanism 60 constitute a right experimental platform, and the right experimental platform can perform up and down movements; the left experimental platform and the right experimental platform cooperate together to perform spatial relative three-dimensional movements; a certain gap can be reserved between the two platforms.

The specific structures of the above-mentioned first driving mechanism 40, the second driving mechanism 50, and the third driving mechanism 60 can be seen in a background patent (Chinese invention patent "seismic fault simulation experimental platform" with the patent application number CN202011402931.6 (publication number CN14383561A)), and will not be described in detail herein.

As shown in FIG. 3, the model to be tested may be partially or completely buried in the soil layer 301 according to the application scenario. The models to be tested can be models for various types of civil engineering structures and infrastructures crossing and spanning active fault zones for large-scale projects such as tunnels, bridges, railways, pipelines, buildings, and the like, and can be applied to various construction fields such as large-scale civil engineering, transportation, water conservancy, and ocean engineering. When the model to be tested is a tunnel model, two ends of the tunnel model may be respectively provided in the through holes 21 of the two end covers 2.

Embodiment 2

Figure 4:
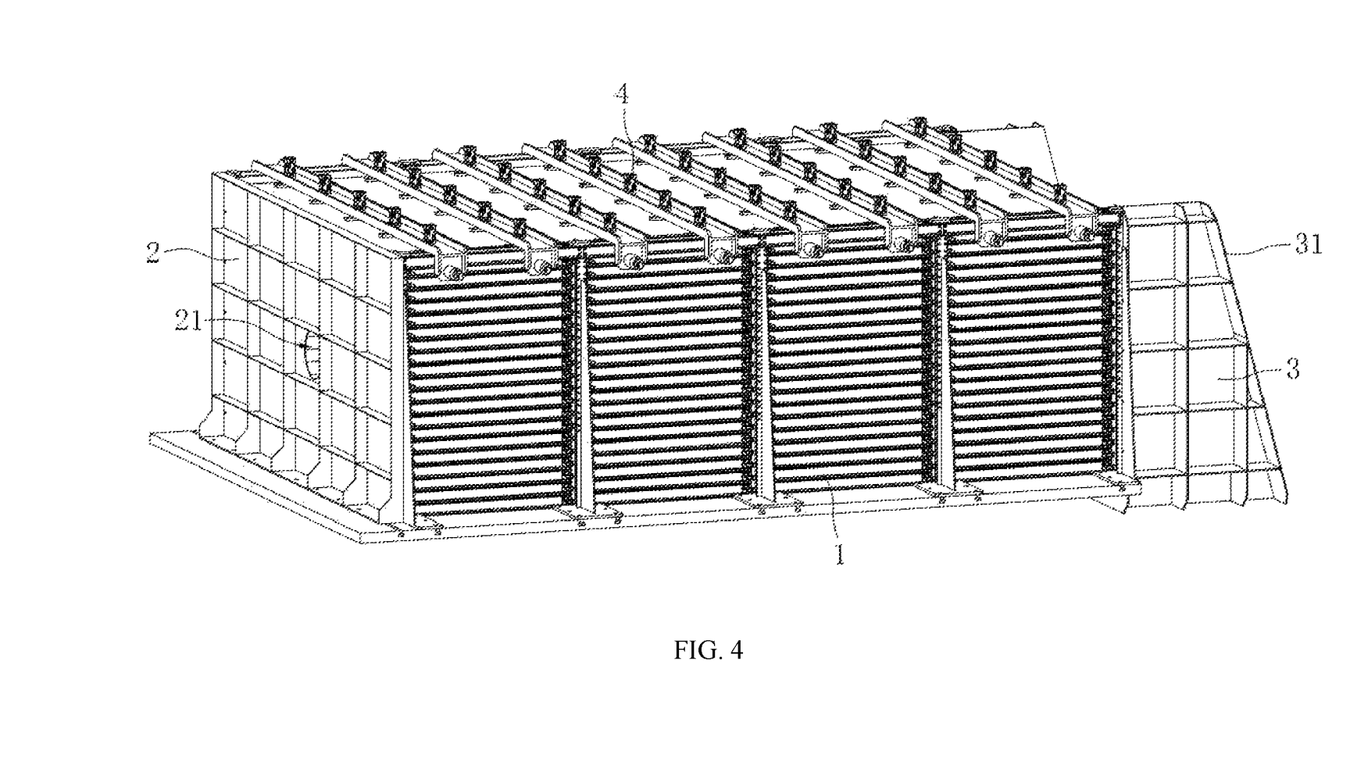
FIG. 4 is a schematic diagram of a three-dimensional structure of a left box body in embodiment 2 of a seismic fault simulation experimental platform of the present invention.
Figure 5:
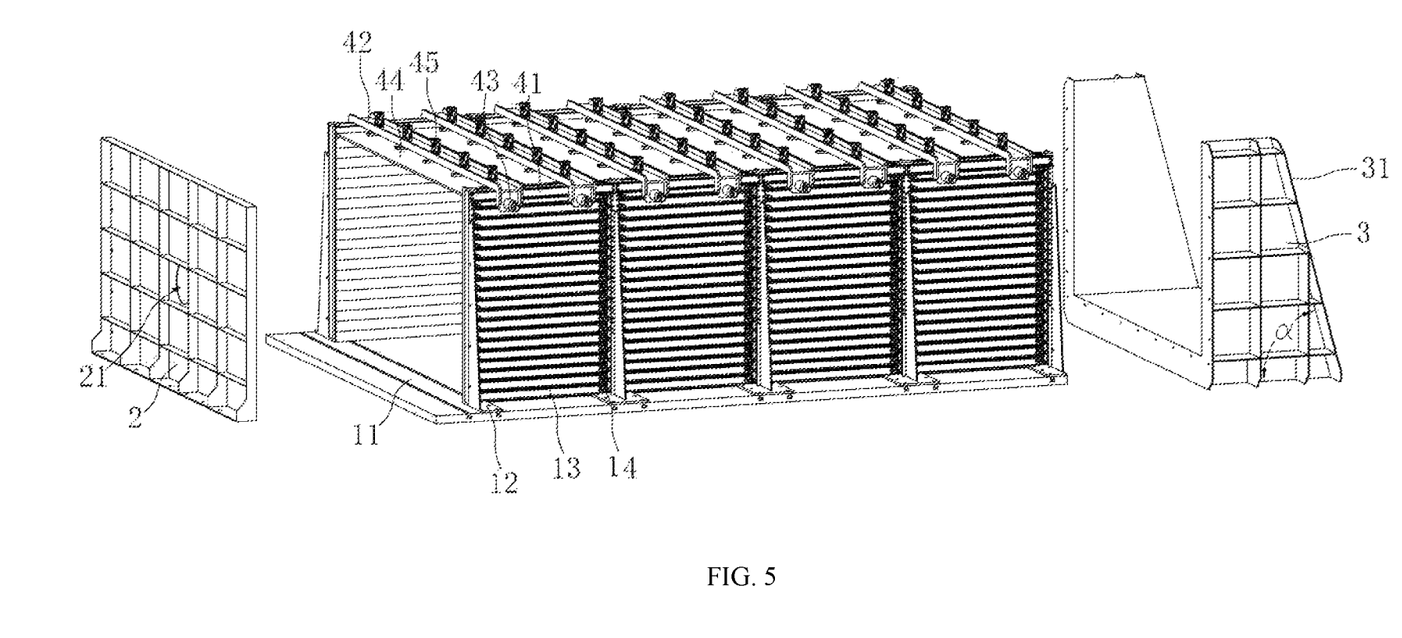
FIG. 5 is a stereoscopic decomposition diagram of the left box body in FIG. 4.

The second preferred embodiment of a seismic fault simulation experimental platform of the present invention is shown in FIGS. 4 to 11. The difference from embodiment 1 is that:

in this embodiment, as shown in FIGS. 4 and 5, an adjustable box body 3 is mounted on the other side of the main box body 1, the side edge of the adjustable box body 3 facing one side of the main box body 1 is detachably connected to the side edge of the other side of the main box body 1, the side edge of the adjustable box body 3 facing away from one side of the main box body 1 is bent and extended outwardly to form a second protruding edge 31, and the second protruding edge 31 of the adjustable box body 3 on the left box body 10 can move relative to the second protruding edge 31 of the adjustable box body 3 on the right box body 20 and is always closely adhered to the second protruding edge 31 of the adjustable box body 3 on the right box body 20.

The included angle between the contact surface between the second protruding edge 31 of the adjustable box body 3 on the left box body 10 and the second protruding edge 31 of the adjustable box body 3 on the right box body 20 and the horizontal plane is recorded as $\alpha$, wherein $45° \leq \alpha \leq 90°$. In the present embodiment, the value of $\alpha$ is 75°. Since the main box body 1 and the adjustable box body 3 are detachably connected, it is only necessary to replace the adjustable box body 3 with a different $\alpha$ value if the model to be tested is to be simulated under the influence of faults with different directions and different geometric parameters.

Figure 6:
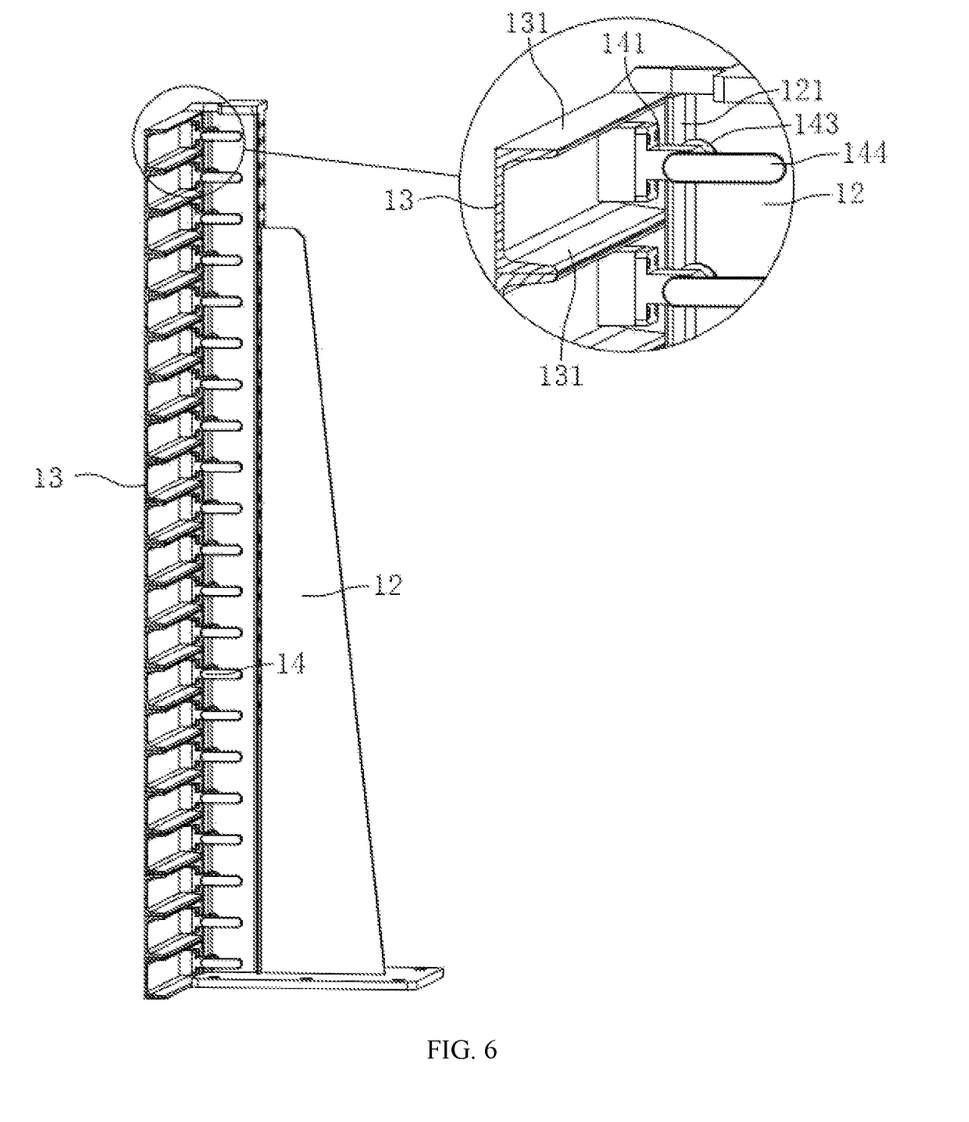
FIG. 6 is a schematic diagram of a three-dimensional structure of a side plate unit in FIG. 4.
Figure 7:
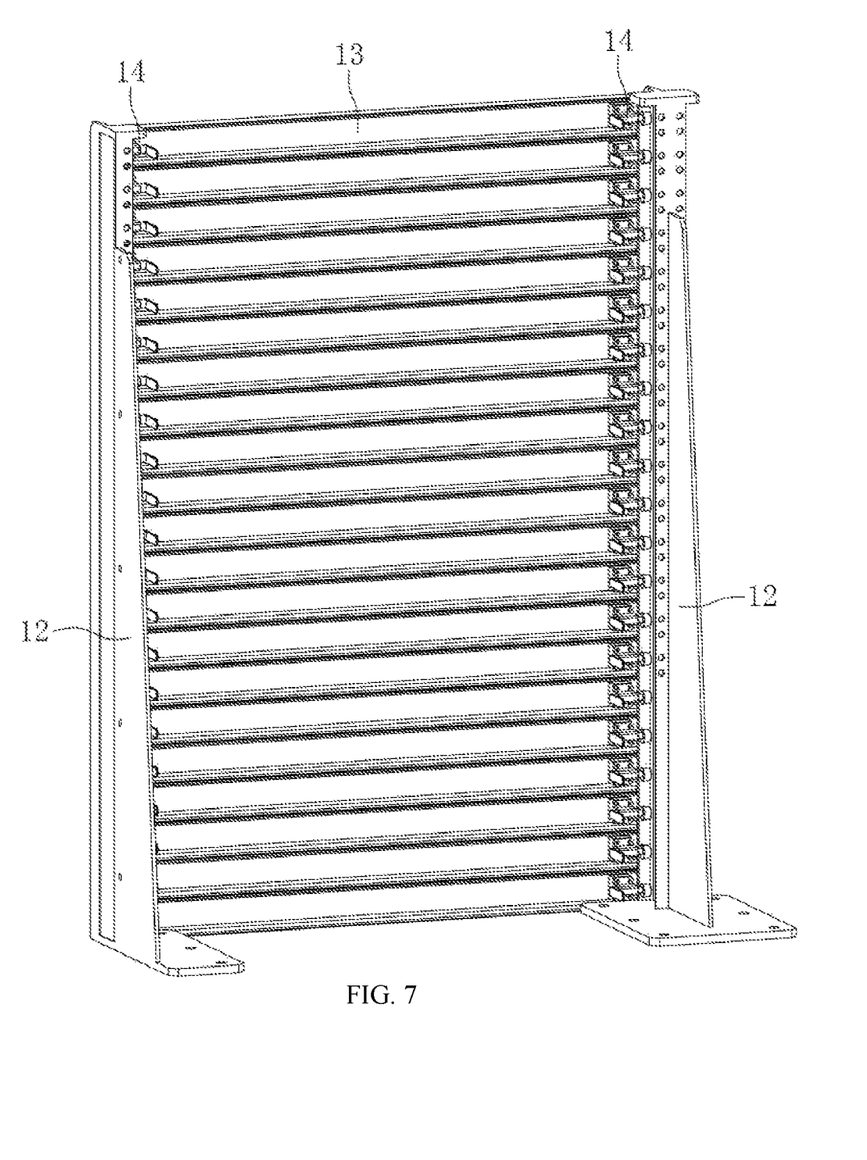
FIG. 7 is a longitudinal sectional view of the side plate unit in FIG. 6.
Figure 8:
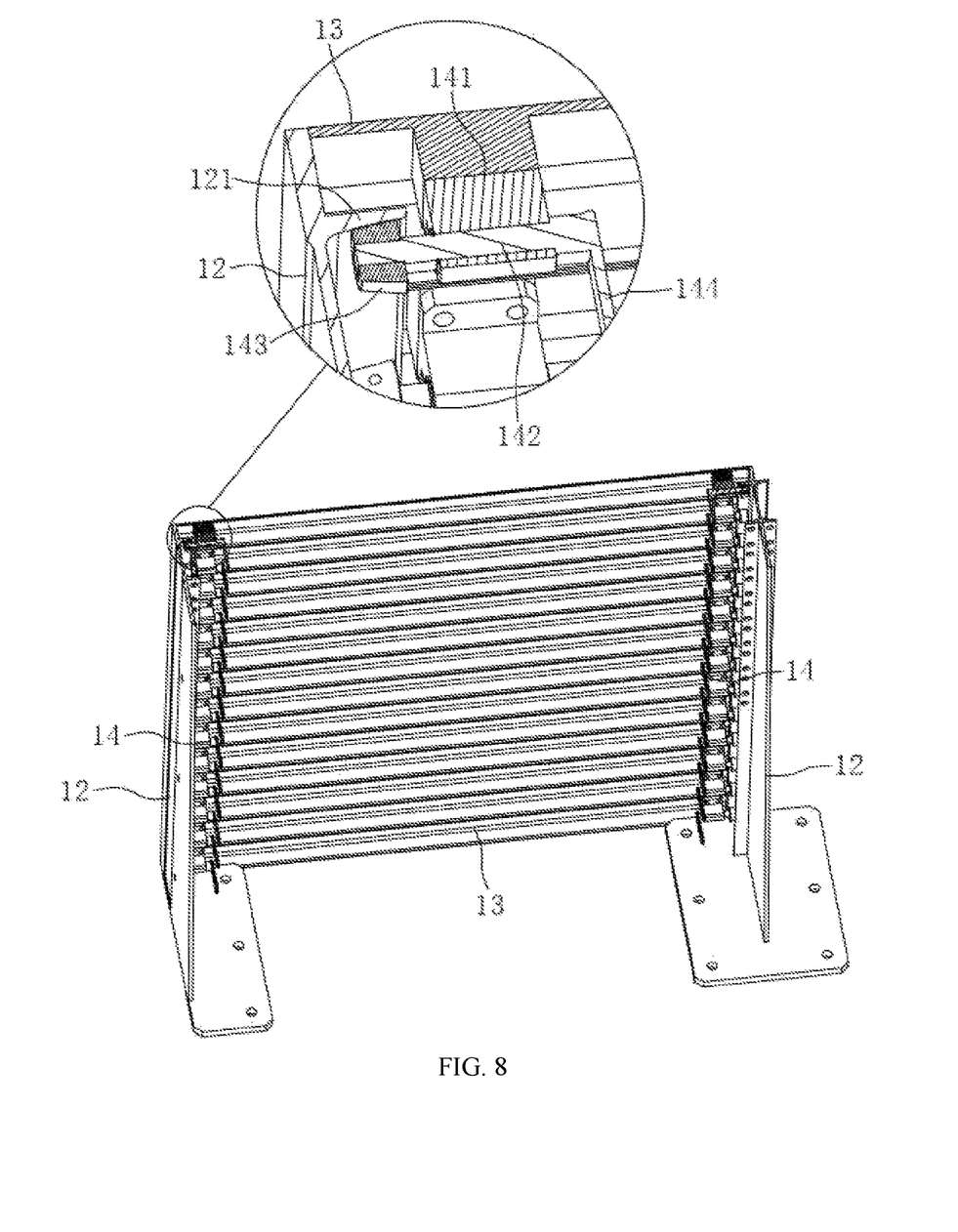
FIG. 8 is a transverse sectional view of the side plate unit in FIG. 6.

In the present embodiment, as shown in FIGS. 6 to 8, each side face assembly structure includes a vertical support frame 12, a blocking member, and a first locking device 14.

Specifically, the number of vertical support frames 12 is at least two, and the vertical support frames 12 are arranged at intervals in the left direction and right direction. The bottom end of each vertical support frame 12 is connected to the bottom plate 11.

The blocking member is located between two adjacent vertical support frames 12 and serves as a box body fence to block the soil layer and avoid the leakage of soil and rock in the box body, and each set of blocking members comprises at least two transverse slats 13 arranged successively in the vertical direction. The end faces of the two ends of each transverse slat 13 respectively abut on the opposite faces of the vertical support frames 12 corresponding to two sides of the blocking member, and the opposite faces corresponding to the two sides of the blocking member are locally and convexly provided with a limiting bar 121 arranged substantially vertically, and the limiting bar 121 is located at the outer side the transverse slat 13; the side edges of each of the transverse slats 13 bend and extend outwardly to form a first protruding edge 131, and the first protruding edges 131 at the adjacent side edges of two adjacent transverse slats 13 abut against each other.

The first locking device 14 is provided between the end of the transverse slat 13 and the vertical support frame 12 adjacent to the end of the transverse slat 13, enabling the transverse slat 13 to be fixed relative to the corresponding vertical support frame 12. Each transverse slat 13 corresponds to two sets of the first locking device 14. Each first locking device 14 includes to a first base 141, a first rotating shaft 142, a cam 143, and a first handle 144. The first base 141 is mounted on the outer side wall of the end of the transverse slat 13; the first rotating shaft 142 is rotatably provided on and passes through the first base 141; the cam 143 is provided at the first end of the first rotating shaft 142, and the peripheral wall of the cam 143 abuts against the outer side wall of the limiting bar 121; the first handle 144 is provided at the second end of the first rotating shaft 142 as an integral piece with the first rotating shaft 142 for driving the first rotating shaft 142 to rotate relative to the first base 141 so that the transverse slat 13 abuts against the inner side wall of the limiting bar 121.

The above-mentioned side plate unit is formed on two adjacent vertical support frames 12 and a blocking member located therebetween, and adjacent sides of the two adjacent side plate units share one vertical support frame 12.

Figure 9:
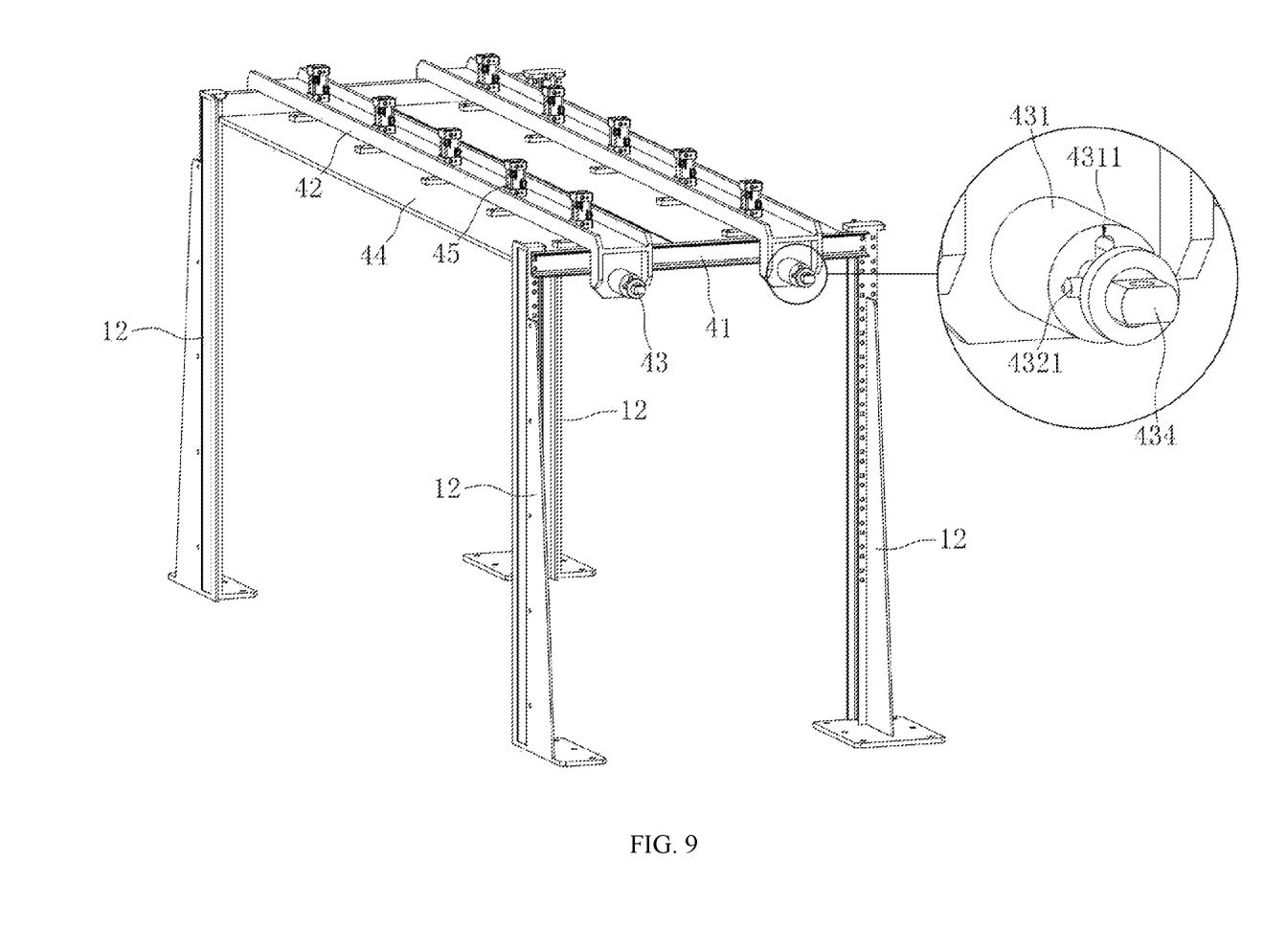
FIG. 9 is a schematic diagram of a three-dimensional structure of a pressing plate unit and a vertical support frame in the unlocked state in FIG. 4.
Figure 10:
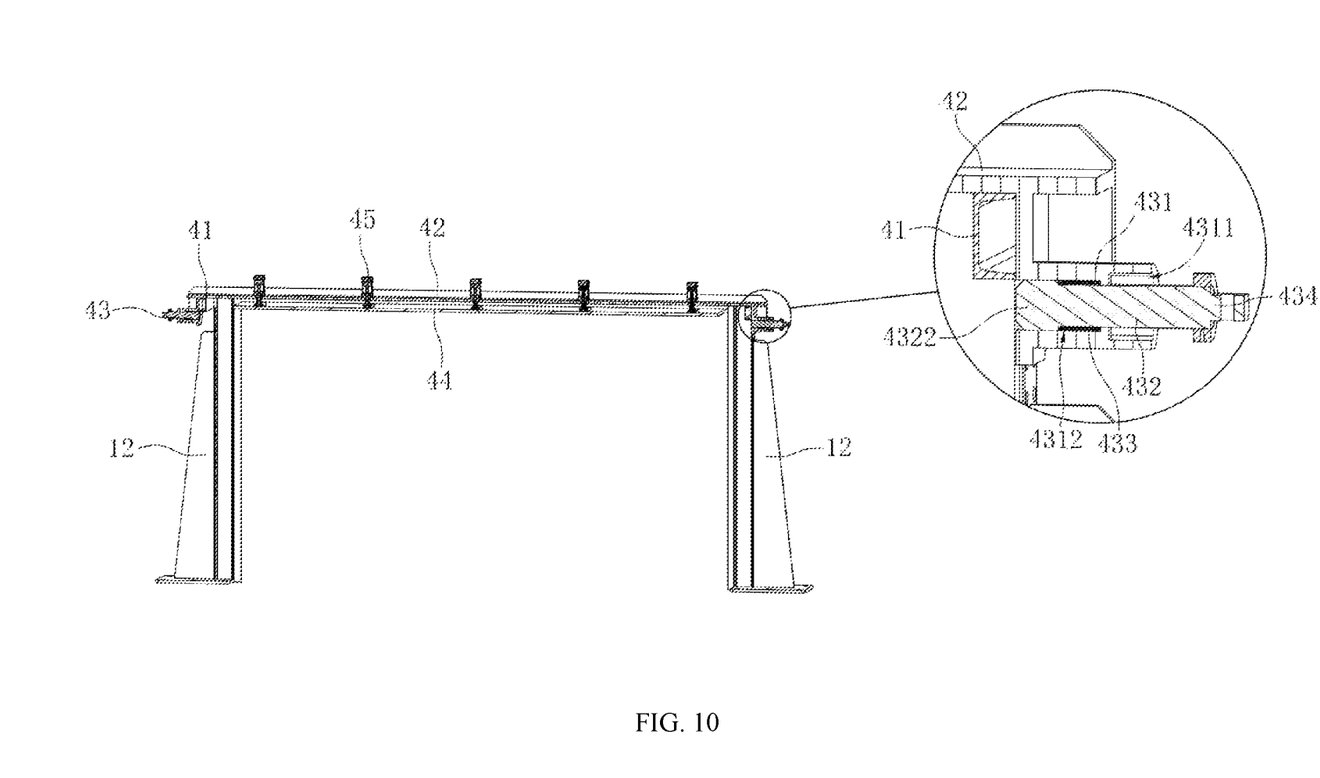
FIG. 10 shows a longitudinal sectional view of the pressing plate unit and the vertical support frame in FIG. 9.
Figure 11:
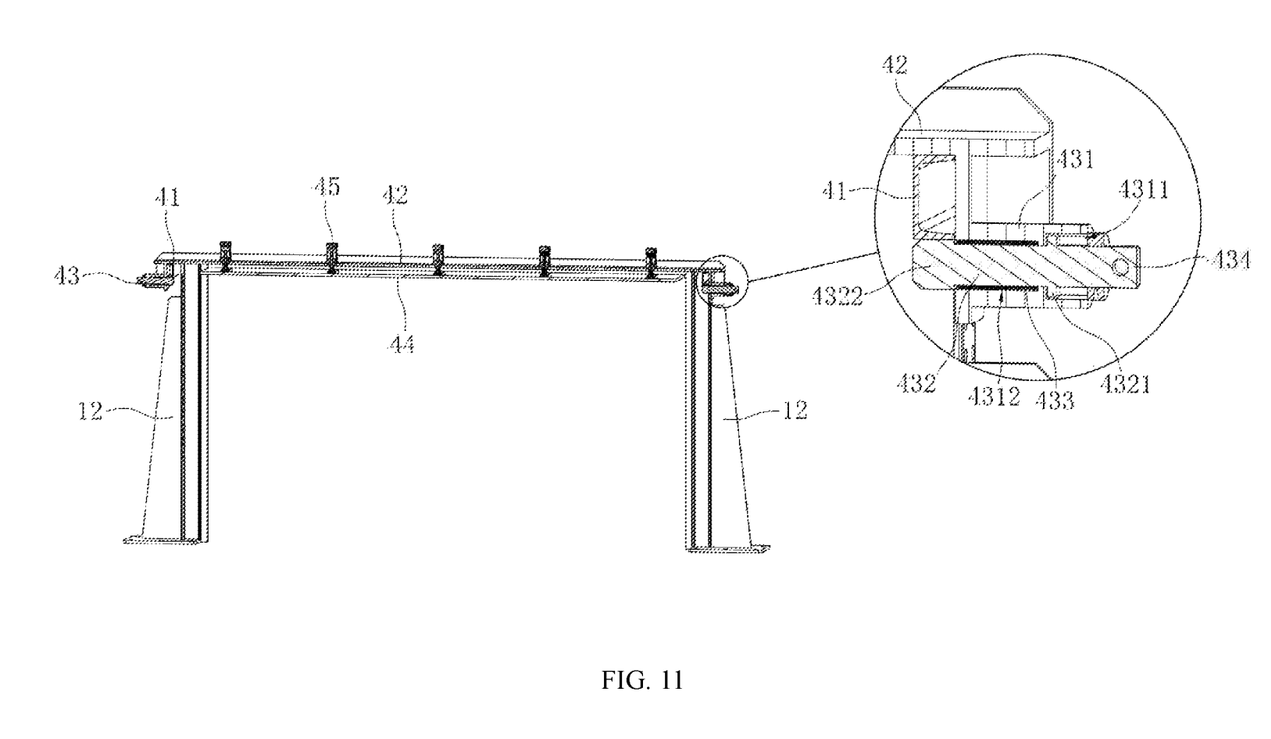
FIG. 11 shows a longitudinal sectional view of the pressing plate unit and the vertical support frame in the locked state in FIG. 9.

In this embodiment, as shown in FIGS. 9 to 11, the pressing plate unit includes a support bar 41, a mounting bar 42, a second locking device 43, a pressing bar 44, and a driving device 45.

Specifically, the number of support bars 41 is two, corresponding to the side plate unit of the corresponding side plate module on a one-to-one basis, and two ends of each support bar 41 are respectively connected to the top ends of two vertical support frames 12 of the corresponding side plate unit.

The number of mounting bars 42 is at least two, and the mounting bars 42 are sequentially arranged in the left direction and right direction. Two ends of each mounting bar 42 are respectively restrained on the two support bars 41 by the second locking device 43.

The second locking device 43 is provided between the end of the mounting bar 42 and the support bar 41 adjacent to the end of the mounting bar 42, enabling the mounting bar 42 to be fixed relative to the corresponding support bar 41. Each mounting bar 42 corresponds to two sets of the second locking device 43, and each second locking device 43 comprises a second base 431, a second rotating shaft 432, an elastic member 433, and a second handle 434. The second base 431 is provided below the end of the mounting bar 42, is an integral piece with the mounting bar 42, and is limited to the outer side of the adjacent support bar 41; the first end of the second base 431 is provided with a limiting groove 4311, and the second end of the second base 431 is provided with an accommodating groove 4312; the second rotating shaft 432 is rotatably provided on and passes through the above-mentioned second base 431 and can slide in an axial direction; a limiting protrusion 4321 corresponding to the limiting groove 4311 is convexly provided on the peripheral wall of the first end of the second rotating shaft 432, and a stopping block 4322 corresponding to the accommodating groove 4312 is provided on the second end of the second rotating shaft 432; the elastic member 433 is a compression spring, the compression spring is sheathed on the periphery of the second rotating shaft 432 and is accommodated in the accommodating groove 4312, and two ends of the compression spring respectively abut against the bottom surface of the accommodating groove 4312 and the stopping block 4322 so that the stopping block 4322 always has a tendency to extend outwards from the accommodating groove 4312; a second handle 434 is provided at the first end of the second rotating shaft 432 and is an integral piece with the second rotating shaft 432 for driving the second rotating shaft 432 to rotate in the circumferential direction or to slide in the circumferential direction; in the locked state, as shown in FIG. 11, the limiting protrusion 4321 is accommodated in the limiting groove 4311 and abuts against the bottom wall of the limiting groove 4311, the stopping block 4322 extends out of the accommodating groove 4312, and the support bar 41 is limited between the stopping block 4322 and the mounting bar 42; in the unlocked state, as shown in FIGS. 9 and 10, the limiting protrusion 4321 abuts the end face of the first end of the second base 431, and the stopping block 4322 is retracted into the accommodating groove 4312 to release the limiting action on the support bar 41.

The number of the pressing bars 44 is at least two, corresponds to the above-mentioned mounting bars 42 on a one-to-one basis, and the pressing bars 44 are located directly below the corresponding mounting bar 42, and adjacent side edges of two adjacent pressing bars 44 are close to each other.

A driving device 45 is mounted on the mounting bar 42 and has a power output end that moves vertically. The power output end is connected to the corresponding pressing bar 44.

Adjacent side edges of adjacent pressing bars 44 of two adjacent pressing plate units are close to each other such that the pressing bars 44 of all pressing plate units are integrally formed with one pressing plate overlying the surface of the soil layer 301.

The working principle of embodiment 2 of the present invention is as below: taking the tunnel model as an example, during a test, (1) according to the research requirements of different sizes of models to be tested, selecting an appropriate number of transverse slats 13 and an appropriate number of vertical support frames 12 such that a main box body 1 of an appropriate length and height can be constituted and completed, respectively mounting an end cover 2 and an adjustable box body 3 of an appropriate size on two sides of the main box body 1, respectively completing the mounting of a left box body 10 and a right box body 20, and then abutting the second protruding edges 31 of the left box body 10 and the right box body 20;

(2) mounting a sensor on the tunnel model, providing and inserting two ends of the tunnel model into through holes 21 of the left box body 10 and the right box body 20, and then pouring soil into the accommodating cavity 30 to form a soil layer 301, so that the tunnel model is embedded in the soil layer 301;

(3) mounting a pressurizing device 4 on the top of the main box bodies 1 on the left box body 10 and the right box body 20;

(4) controlling the driving device 45 to push each pressing bar 44 down to form one pressing plate covering the surface of the soil layer 301 as a whole;

(5) controlling the first driving mechanism 40 and the second driving mechanism 50 to drive the left box body 10 to move horizontally, and driving the right box body 20 to move vertically via the third driving mechanism 60, so as to finally reach the displacement amount of the soil layer 301 caused by the seismic fault needing to be simulated; at the same time, each independent driving device 45 applying different pressures to the soil layer 301 at different positions via the pressing bar 44, which is used for accurately simulating different pressures at different positions of the soil layer buried with civil engineering structures and infrastructures in an actual environment; and (6) using the data recorded by the sensor to analyze the effect of faults on the model to be tested in different ground activity states.

Of course, the above description is not intended to limit the present invention, and the present invention is not limited to the above examples. Any changes, modifications, additions, or replacements made by technical personnel in the field within the substantive scope of the present invention shall also fall within the scope of protection of the present invention.

What is claimed is:

1. A matching box body structure for simulating fault motion, comprising:
a left box body and a right box body arranged in a left and right matching manner, wherein inner cavities of the left box body and the right box body are in communication and form an accommodating cavity for accommodating a soil layer; both the left box body and the right box body comprise:
a main box body, the main box body having an opening on two sides in left direction and right direction and the top side having an opening, wherein the main box body comprises: a bottom plate, and two side surface assembly structures mounted on a front side and rear side of the bottom plate, wherein the assembly structure comprises at least two vertical support frames, the vertical support frames are arranged at intervals in the left direction and right direction, the vertical support frames are arranged vertically, a bottom end of the vertical support frame is connected to the bottom plate, a blocking member is provided between two adjacent vertical support frames, the blocking member comprises at least two transverse slats arranged successively in a vertical direction, in each set of blocking members, end faces of two ends of each transverse slat respectively abut opposite faces of the vertical support frame corresponding to two sides of the blocking member, and adjacent side edges of two adjacent transverse slats abut against each other;

and an end cover, wherein the end cover is provided at the opening of one side of the main box body;

wherein each of the side face assembly structures further comprises a first locking device provided between an end of the transverse slat and the vertical support frame adjacent to the end of the transverse slat for fixing the transverse slat relative to the corresponding vertical support frame.

2. The matching box body structure for simulating fault motion according to claim 1, wherein a substantially vertically arranged limiting bar is locally and convexly provided on opposite faces of the vertical support frame corresponding to two sides of the blocking member, the limiting bar being located on an outer side of the transverse bar;

the first locking device comprises:
a first base provided on the transverse slats;
a first rotating shaft, the first rotating shaft being rotatably connected to the first base, and the first rotating shaft penetrating through the first base;
a cam provided at one end of the first rotating shaft, a peripheral wall abutting against an outer side wall of the limiting bar; and
a first handle provided at the other end of the first rotating shaft for driving the first rotating shaft to rotate relative to the first base so that the transverse slat abuts on an inner side wall of the limiting bar.

3. The matching box body structure for simulating fault motion according to claim 1, wherein a first protruding edge is provided at a side edge of the transverse slat, the first protruding edges at adjacent side edges of two adjacent transverse slats abutting against each other.

4. The matching box body structure for simulating fault motion according to claim 1, wherein two adjacent vertical support frames and blocking members located therebetween are denoted as side plate units, a corresponding set of side plate units respectively located on two side surface assembly structures is set as one side plate module, a pressurizing device is mounted on a top of the main box body, the pressurizing device comprises pressing plate units corresponding to the side plate modules on a one-to-one basis, and the pressing plate unit comprises:
a support bar, wherein two support bars are provided, the two support bars correspond to the side plate unit corresponding to the side plate module on a one-to-one basis, and two ends of each support bar are respectively connected to top ends of two vertical support frames of the corresponding side plate unit;
a mounting bar, wherein at least two mounting bars are provided, the mounting bars are successively arranged in a left direction and right direction, and two ends of each mounting bar are respectively limited on two of the support bars: a pressing bar,
wherein at least two pressing bars are provided, the pressing bar corresponds to the mounting bar on a one-to-one basis, the pressing bar is located directly below the corresponding mounting bar, and adjacent side edges of two adjacent pressing bars are close to each other; and
a driving device mounted on the mounting bar, wherein the driving device has a power output end moving in a vertical direction, and the power output end is connected to a corresponding pressing bar; adjacent side edges of adjacent pressing bars of two adjacent pressing plate units are close to each other such that the pressing bars of all pressing plate units are integrally formed with one pressing plate covering a surface of the soil layer.

5. The matching box body structure for simulating fault motion according to claim 4, wherein the pressing plate unit further comprises:
a second locking device provided between the end of the mounting bar and a support bar adjacent to the end of the mounting bar, for fixing the mounting bar relative to the corresponding support bar.

6. The matching box body structure for simulating fault motion according to claim 5, wherein the second locking device comprises:
a second base, wherein the second base is provided on the mounting bar,
one end of the second base (431) is provided with a limiting groove (4311), and the other end of the second base is provided with an accommodating groove (4312);
a second rotating shaft, wherein the second rotating shaft is rotatably connected to the second base, the second rotating shaft penetrates through the second base, the second rotating shaft can slide in an axial direction, a limiting protrusion (4321) corresponding to the limiting groove (4311) is convexly provided on a peripheral wall of a first end of the second rotating shaft, and a stopping block (4322) corresponding to the accommodating groove (4312) is provided on a second end of the second rotating shaft;
an elastic member provided between the second base and the stopping block (4322), in the same way that the stopping block (4322) always has a tendency to overhang the accommodating groove (4312); and
a second handle provided at the first end of the second rotating shaft for driving the second rotating shaft to rotate in a circumferential direction or to slide in the circumferential direction; wherein in a locked state, the limiting protrusion (4321) is accommodated in the limiting groove (4311) and abuts against a bottom wall of the limiting groove (4311), the stopping block (4322) extends out of the accommodating groove (4312), and the support bar is limited between the stopping block (4322) and the mounting bar, in an unlocked state, the limiting projection (4321) abuts against an end face of the first end of the second base, and the stopping block (4322) is provided in the accommodating groove (4312) for releasing a limiting action on the support bar.

7. The matching box body structure for simulating fault motion according to claim 6, wherein the elastic member is a compression spring sleeved on the periphery of the second rotating shaft and arranged in the accommodating groove (4312), and two ends of the compression spring respectively abut on a bottom surface of the accommodating groove (4312) and the stopping block (4322).

8. The matching box body structure for simulating fault motion according to claim 1, wherein an adjustable box body is mounted on the other side of the main box body, a side edge of the adjustable box body facing one side of the main box body is detachably connected to the side edge of the other side of the main box body, and the side edge of the adjustable box body facing away from one side of the main box body is provided with a second protruding edge; a second protruding edge of the adjustable box body on the left box body can move relative to the second protruding edge of the adjustable box body on the right box body and is always closely adhered to the second protruding edge of the adjustable box body on the right box body, and an included angle between a contact surface between the second protruding edge of the adjustable box body on the left box body and the second protruding edge of the adjustable box body on the right box body and a horizontal plane is denoted as $\alpha$, wherein $45° \leq \alpha \leq 90°$.

* * * * *